Feb. 27, 1968 — R. C. CHANAUD — 3,370,463
MASS FLOW METER
Filed July 29, 1964

INVENTOR
Robert C. Chanaud
BY Eli Weiss
ATTORNEY

United States Patent Office

3,370,463
Patented Feb. 27, 1968

3,370,463
MASS FLOW METER
Robert C. Chanaud, Somerville, N.J., assignor to American Standard Inc., a corporation of Delaware
Filed July 29, 1964, Ser. No. 385,861
11 Claims. (Cl. 73—194)

ABSTRACT OF THE DISCLOSURE

The invention relates to mass flow measurements. A swirling fluid passes through a fluid conduit which undergoes a cross sectional area increase. This causes the axis of the swirling fluid to precess with respect to the major axis of the conduit. The precession is manifested by measurable pressure and temperature fluctuations in the fluid. Sensor means is employed which is responsive to fluid parameter fluctuations in the precessing fluids. The mass flow of the fluid is determined from the frequency and amplitude of the fluctuations.

---

This invention relates to mass flow measurements and, more particularly, to a novel method of and apparatus for such measurements utilizing the instability of a swirling flow of fluid.

Various basically different arrangements for metering or measuring the flow of fluids in closed conduits, or along confirmed paths, are known to the art. These different arrangements include, for example, inferential mechanical meters such as those of the turbine type, pressure differential meters, such as the Venturi, orifice plate, nozzle, Dall tube, laminar flow, and "Lo-Loss" meters, ultrasonic meters, and electromagnetic meters. All of these known types of measuring devices are subjected to various disadvantages such as, for example, high pressure losses, limitations to measuring the flow of liquids only and not being applicable to measuring the flow of gases, errors due to swirl, relatively low accuracies, non-linear response characteristics, relatively long response times, limitations to small ranges of size, errors due to non-uniformity in the flow, difficulty in converting the output measurements into readily accessible form, high power requirements in the case of electromagnetic meters, and other errors, most of which are well known to those skilled in the art.

Each of the meters basically measures a volumetric flow of fluid. However, in many instances it is more important to measure the flow mass of fluids. In many chemical applications, the various quantities of reactants are best specified according to mass. When such a situation arises and volumetric metering devices are employed it is necessary to convert the volume measurements to mass measurements. This may be accomplished by multiplying the volume measurements by the density of the fluid. Accordingly, volumetric fluid flow measuring devices may include indicating means calibrated to account for the density factor. However, it should be apparent that such devices have limited accuracies. It is well known that the density of a fluid is a function of the temperature of the fluid as well as the pressure exerted on the fluid. When the fluid is a gas the dependence of density on temperature and pressure is more pronounced. Hence, it is not possible to merely provide a constant of proportionality between the volume and the mass of the fluid being measured. Therefore, present indirect measurements of mass of fluid flow through the agency of volumetric measurements of fluid flow have only limited accuracy.

There have been proposed mass flow meters and also densitometers employing the measurement of the transit time of acoustic waves through a liquid. However, these devices require at least one active transducer to generate the acoustic waves. In addition to employing circuitry and power for driving the active transducer, further circuitry is required for analyzing and operating on signals generated by a receiving transducer. Therefore, ultrasonic measuring devices are relatively expensive to manufacture and operate.

An object of the present invention is to provide fluid mass flow measuring apparatus having a degree of accuracy of the order of better than —3%, and utilizing a pressure or temperature responsive passive transducer means.

It is another object of the invention to provide a mass flow meter which has a virtually linear response.

It is still another object of the invention to provide a mass flow meter which can be used with all homogeneous fluids.

It is also an object of the invention to provide a mass flow meter which has a short response time.

It is a further object of the invention to provide a mass flow meter which can measure the mass flow rate of a fluid in either laminar or turbulent flow and across the flow rate range where transition from one to the other occurs.

It is another object of the invention to provide a mass flow meter which has neither any moving parts nor employs actively driven transducers.

It is still another object of the invention to provide a mass flow meter which has improved resistance to loss of calibration with time.

It is also an object of the invention to provide a flow meter which can be used to measure the mass flow rate of fluid in practically any size pipe and over a broad flow rate range.

It is yet a further object of the invention to provide an improved method of measuring the mass flow rate of a fluid.

It is yet a still further object of the invention to provide an improved method of measuring the mass flow rate of a fluid through the agency of two characteristics of a single hydrodynamic property of a flowing fluid.

It is a further object of the invention to provide a mass flow meter which can be converted to or operated simultaneously as a highly accurate volumetric flow meter with no additional cost or change of apparatus.

Generally, the invention contemplates the introducing of an unstable swirling flow in a fluid passing through a fluid conduit whose cross-sectional area increases. The cross-sectional increase in area of the conduit creates a fluid back flow along the major axis of the conduit and the overall flow becomes unstable. The instability causes the axis of swirl of the fluid to precess with respect to the major axis of the conduit. The precession is manifested by measurable pressure and temperature fluctuations in the fluid caused by the alternate conversion between hydrostatic energy and kinetic energy in the swirling fluid. The amplitude of the pressure or temperature fluctuations is accordingly proportional to the kinetic energy of the product of the density of the fluid and the square of its flow velocity, while the frequency of the pressure or temperature fluctuations is proportional to flow velocity. It should be noted that the ratio of kinetic energy and flow velocity is directly proportional to the density of the fluid and the volumetric flow rate and, therefore, the mass flow rate. Accordingly, if a sensor means or transducer senses the pressure or temperature fluctuations, and the frequency and amplitude characteristics of this property are converted into signals which are fed to a suitable operational arithmetic device an output signal is generated which is proportional to the mass flow rate. Furthermore, if the output signal is fed to a suitable integrating device total mass flow can be measured.

Other objects, and the features and advantages of the invention, will be apparent from the following detailed description when read with the accompanying drawings which show by way of example, and not limitation, the various embodiments of the invention.

Figure 6:
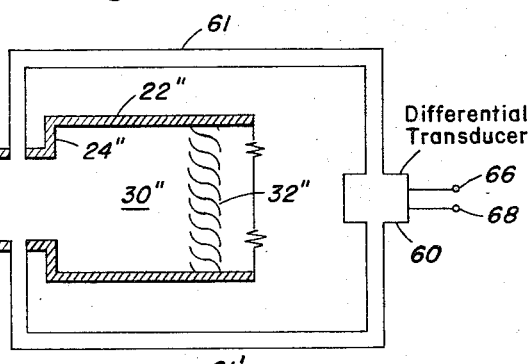
Figure 7:
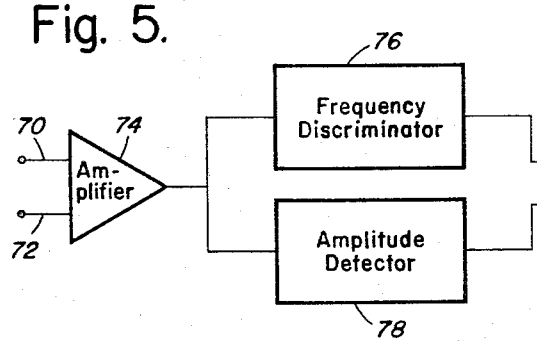

FIG. 6 is a longitudinal sectional view, partially in schematic, of an alternate arrangement of the transducers for generating signals representing fluid flow in a conduit; and FIG. 7 is a block diagram of electrical apparatus for processing the electrical signals generated by the transducers of FIGS. 1, 3, 4 and 5 to give indications of mass flow rate and total mass of fluid flowing through conduits in accordance with the invention.

Generally, in accordance with the present invention, the fluid whose mass flow rate and total mass are to be measured is first forced to assume a swirl component by converting hydrostatic or pressure energy into kinetic energy. Then the swirling fluid is caused to precess at a rate proportional to the fluid flow rate. These effects can be achieved by confining the flowing fluid within a conduit means having operatively associated therewith swirl means effective to urge the fluid flowing through the conduit means to assume a swirl condition. The swirling fluid is then caused to precess by a suitable arrangement such as, for example, directing the swirling fluid to flow into an enlarged cross-sectional region of the conduit means. The enlarged area, or the increase in area, promotes a particular kind of hydrodynamic instability which causes the low pressure center of the swirling fluid to precess at a discrete frequency about the center line or major axis of the conduit means or fluid flow path. If the center line of the swirling fluid could be made visible by suitable means, it would be seen to trace out a conical shape in the region of the conduit means having the increase in cross-sectional area. A further description of this phenomenon can be found in my prior Patent No. 3,279,251; "A Vortex Whistle," B. Vonnegut, Journal of the Acoustical Society of America, vol. 26, 1954, pp. 18–20; "Experiments Concerning the Vortex Whistle," R. C. Chanaud, vol. 35, No. 7, 1963, pp. 953–960; and Vonnegut Patent No. 2,794,341.

This precession of the low pressure center, which will be hereinafter referred to as "swirl precession," has a rate which, in certain cases, is directly proportional to the mean volumetric flow rate of the flow. Thus, a suitable sensor means, operatively exposed to the precessing swirling fluid, can detect this cycling of the swirl precession by detecting its associated pressure or temperature fluctuations thus be made to transmit a signal having a frequency characteristic proportional to the velocity of fluid flow and an amplitude proportional to the density of the fluid. When the frequency and amplitude characteristics are separated into different signals, the different signals may be arithmetically operated upon to produce signals related to mass flow rate and total mass of fluid passing through the conduit means. Good results are obtained when the sensor means is positioned in the vicinity of the enlarged cross-sectional area of the conduit means or the area increase.

Figure 1:
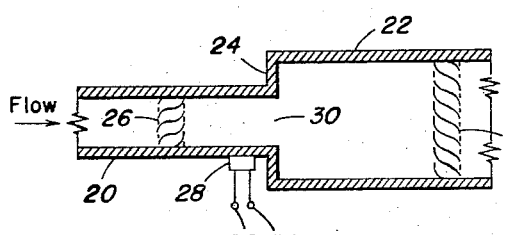
FIG. 1 is a longitudinal sectional view of a fluid conduit including a single transducer for measuring mass flow of fluid in accordance with an embodiment of the invention.

With reference to FIG. 1 there is illustrated a structure in accordance with the principles of this invention. A first fluid conduit means 20 and a second fluid conduit means 22—the second fluid conduit means having an internal diameter larger than the internal diameter of the first fluid conduit means—can be coupled together through an abrupt coupling means 24 such as a wall member positioned at substantially right angles to each of the fluid conduit means. Although the coupling is abrupt it is possible to employ a tapered coupling. Swirl means 26 is coupled to the first fluid conduit means 20 to force the fluid flowing therethrough into a swirling motion. The swirl means can be in the form of fixed blades positioned within the first fluid conduit means 20, or convolutions positioned within the interior surface of the fluid conduit means 20 or vanes positioned along the interior surface of the first fluid conduit means 20. It has been found that the linearity of this device is determined by the design of the swirl means. For example, a linear device is obtained if fixed blades with a given exit angle with respect to the major axis of the conduit means are used. Sensor means 28 is positioned to best detect the hydrodynamic characteristics of the fluid due to the swirl precession.

Since the swirling flow is precessing there are pressure and temperature fluctuations present in the flow. Therefore, there are several methods by which the frequency and amplitude of the swirl precession can be detected. A pressure sensitive means such as a diaphragm pressure transducer or piezoelectric crystal or the like can be utilized to generate electrical signals representing the fluctuations of pressure; or a temperature sensitive means such as a thermocouple, bolometer, or the like can be utilized to generate electrical signals representing the fluctuations of temperature. In either case, the electrical signals are transmitted from terminals 32 and 34 of transducer 28.

In operation, the fluid whose mass and mass flow rate are to be determined, is fed to the first fluid conduit means 20 and exits from the second fluid conduit means 22. Swirl means 26 forces the fluid, which can be either gas or liquid, into a swirl condition. The presence of the enlargement 30 which the fluid encounters as it flows out of the first fluid conduit means 20 or first pipe having a substantially circular cross section and into the second fluid conduit means 22—a second pipe having a substantially circular cross section causes the swirling fluid to become unstable or, in other words, the center or axis of the swirling fluid precesses and traces a cone.

Because of the precession the transducer 28 transmits from terminals 32 and 34 an alternating signal whose frequency of alternation is proportional to the velocity of fluid flow and whose amplitude is proportional to the density of the fluid and the square of the velocity of fluid flow as hereinbefore indicated. The description of the utilization of this signal to indicate mass flow rate and total mass will be deferred until the various embodiments of the signal generations means are described.

It should be noted that if desired, deswirl means 32 can be coupled to the second fluid conduit means 22 to recapture some of the pressure loss which is caused by presence of the swirl means 26. The deswirl means can be in the form of fixed blades positioned within the first fluid conduit means 22. Experimentation has disclosed that an area increase between the first fluid conduit means 20 and the second fluid conduit means 22 as small as 2:3 gives good results (all larger increases in area are found to also give good results); and that the placing of the swirl means 26 two diameters upstream from the end of the first fluid conduit means 20 provides a swirl without interfering with the precession.

While a single transducer may be used as the sensor means for the pressure or temperature fluctuations associated with the precession of a swirling fluid flowing along a confined path, there are times when a single transducer limits the accuracy of the measurements. In particular, a single transducer will not only sense the fluctuations due to the precessing swirl, but also will be sensitive to other pressure waves, hereinafter referred to as sonic vibrations, which pass down the fluid conduit means or confined path. It is to be understood, however, that the word sonic was chosen for convenience only and does not imply or mean that the vibrations are only in the audible range—they can be either in the subsonic, sonic, or ultrasonic range, separately or combined. Thus, the output of such a transducer will not be representative of the frequency and amplitude of precession of the swirl and, therefore, will not give a true indication of the mass flow.

Accordingly, it is more desirable to employ a pair of transducers which are arranged in opposed relation transverse the fluid conduit means or confined flow path, as by being diametrically opposite each other along a pipe constituting the fluid conduit means. In this case, pulses due to sonic vibrations will be in-phase with respect to both transducers. However, the pulses due to the precessing swirl will be out-of-phase with respect to the two transducers by substantially 180°. A further description of this arrangement is found in the pending application of Alan E. Rodely, Ser. No. 366,496, now U.S. Patent No. 3,314,-289, filed May 11, 1964, entitled, "Swirl Flow Meter Transducer System," which is owned by the same assignee herein.

By virtue of this in-phase relation of the sonic vibration and the out-of-phase relation of the pulses due to the precessing swirl, an output which is responsive only to the out-of-phase pulses can be provided by connecting the electrical outputs of both transducers in parallel or series with each other or by using an electronic differential amplifier. With such electrical connection arrangements, the outputs due to pulses resulting from sonic vibrations will cancel each other due to their being in-phase with respect to both transducers. However, the outputs responsive to pulses from the precessing swirling fluid, and which are out of phase with each other, will provide a combined output which is responsive only to the out-of-phase pulses. Thereby, the use of two transducers arranged in opposed relation transverse of a fluid conduit means will provide an alternating output signal whose frequency is proportional to the frequency of precession of a swirling fluid and whose amplitude is proportional to the pressure or temperature fluctuations of the swirling fluid.

A variation to this approach is the use of a single differential transducer having inputs connected to two diametrically opposite points of the fluid conduit means or confined flow path. In this case, the in-phase pulses due to sonic vibrations will be in opposition at the differential transducer and this will produce substantially no output. On the other hand, the out-of-phase pulses due to the precessing swirl will produce an output which is double that of a single transducer connected to only one point along the fluid conduit means or confined flow path.

Figure 2:
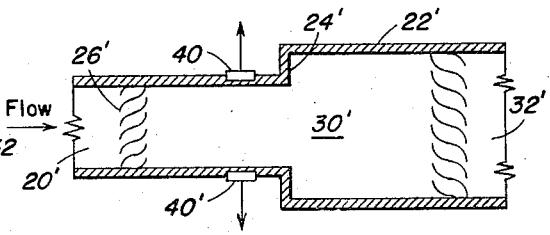
FIG. 2 is a longitudinal sectional view of a fluid conduit including a pair of transducers for measuring the mass flow of fluid in accordance with another embodiment of the invention.
Figure 3:
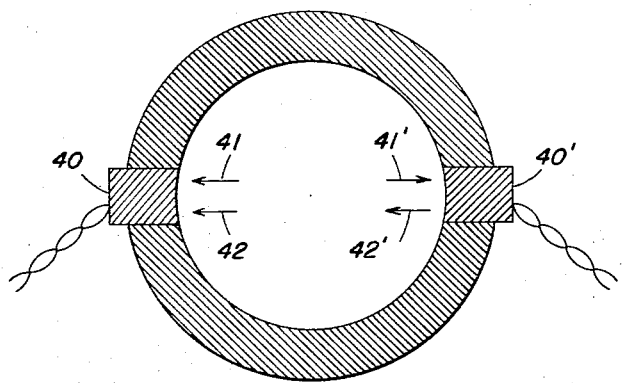
FIG. 3 is a cross-sectional view taken through the transducers of FIG. 2.
Figure 4:
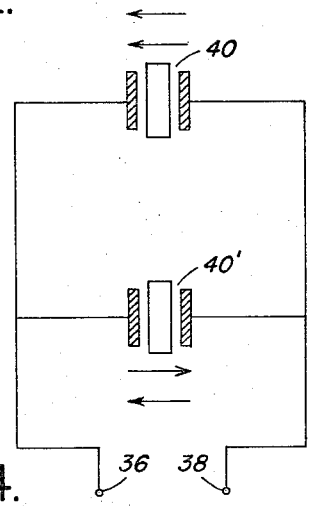
FIG. 4 is a schematic circuit of the parallel connection of the transducers of FIG. 2 to yield an electrical signal representing the hydrodynamic state of the fluid in the conduit of FIG. 2.
Figure 5:
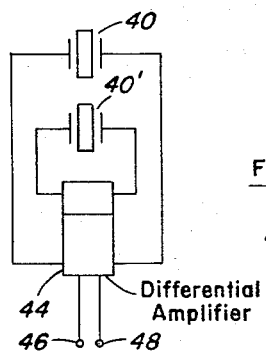
FIG. 5 is another schematic circuit diagram wherein the signal outputs of the transducers of FIG. 2 are connected to a differential amplifier which produces an electrical signal representing the hydrodynamic state of the fluid.

Referring now to FIG. 2, a flow meter in accordance with another embodiment of the invention is illustrated. Since the conduit means are similar to that shown in FIG. 1, primed reference characters will be employed for like elements. The flow meter includes a fluid conduit means having a first fluid conduit means or entrance section 20' which communicates with an enlarged cross-sectional area 30' in a second fluid conduit means 22' through the medium of a relatively abrupt transition or coupling means 24'. For example, the diameter of second fluid conduit means 22' may be substantially larger than the diameter of first fluid conduit means 20', to provide the enlarged cross-sectional area 30'. The transition or coupling means 24' may be a wall extending diametrically of the first fluid conduit means, or the wall of coupling means 24' may slope to provide a gradually merging transition section between conduit means 20' and 22'.

Swirl means 26' is operatively associated with first fluid conduit means 20' to force the fluid flowing therethrough into a swirling motion. Swirl means 26' can be in the form of fixed blades positioned within the interior surface of the first fluid conduit means 20', or of vanes positioned along the interior surface thereof.

The fluid whose flow rate is to be measured is delivered to the first fluid conduit means 20' and exits therefrom into the second fluid conduit means 22'. Swirl means 26' forces the fluid, which may be either a gas or a liquid, into a swirling state. The presence of enlargement 30' which the fluid encounters as it flows from first fluid conduit means 20', which latter may be a pipe having a substantially circular cross section, and into the second fluid conduit means 22', which also may be a pipe having a circular cross section, causes the swirling fluid to become unstable and to precess as heretofore described. By measuring or sensing the frequency and amplitude of the pressure or temperature fluctuations resulting from the precession of the swirling fluid, an indication of the mass flow rate may be obtained.

In accordance with one preferred embodiment of the invention, a sensor means comprising a pair of pressure transducers 40 and 40' is arranged in the wall of pipe or first fluid conduit means 20' downstream of swirl means 26' and upstream of enlarged area 30'. The transducers 40 and 40' are arranged in diametrically opposed relation. As stated, pressure transducers such as 40 and 40' are sensitive not only to the pressure pulses due to the precession of the swirling fluid, but are also sensitive to sonic waves or vibrations passing along the fluid conduit means. With respect to sonic vibrations of the fluid, a sound wave traveling along the fluid conduit means will effect a positive pressure pulse against each of the transducers 40 and 40' at the same instant. In other words, the pressure pulses due to sonic vibrations are in phase with respect to both transducers 40 and 40'. This is indicated by the arrows 41 and 41' of FIG. 3, which represent the pressure pulses due to sonic vibration.

However, with respect to pressure pulses due to the precession of the swirling fluid, whereby the low pressure center of the swirling fluid revolves about the major axis of the fluid conduit means, the pulses on the two transducers 40 and 40' are substantially 180° out of phase as indicated by the arrows 42 and 42'. That is, the low pressure area of the swirling fluid is effective upon transducer 40', for example, at substantially a 180° angular displacement in time from its effect upon the transducer 40. A similar phenomena occurs for temperature pulses.

Stated another way, and assuming that a sonic vibration comprises a series of alternating positive and negative pulses along the fluid conduit means, a first positive pulse will be effective upon both transducers 40 and 40' at the same time, and the succeeding negative pulses will be effective upon the transducers 40 and 40' simultaneously. Thus, both transducers 40 and 40' will be simultaneously subjected to a positive pulse, or a reduction in pressure. The pulses due to sonic vibrations are thus in phase with respect to both transducers 40 and 40'.

It is possible to take advantage of these relationships by connecting the two transducers 40 and 40' in parallel or in series in an electrical circuit. With the arrangement shown in FIG. 4, the in-phase pressure or temperature pulses due to sonic vibrations oppose each other. Thus, mutual cancellation occurs. The same results are obtained with the arrangement of FIG. 5 wherein the transducers are connected to a differential amplifier 44. If desired, the transducers or sensor means can be connected in series. In the series network the differential amplifier is not required. On the other hand, the out-of-phase pressure or temperature pulses due to the precession of the swirling fluid are additive and constitute the combined output of the two transducers. As a result, the in-phase pressure or temperature pulses across the fluid conduit means 20' are greatly reduced in value if not completely nullified, and the out-of-phase pressure or temperature pulses may, therefore, be measured both as to frequency and as to amplitude. The out-of-phase output signals are applied to terminals 36 and 38 of the parallel transducer embodiment of FIG. 4 and terminals 46 and 48 of the differential amplifier embodiment of FIG. 5. The utilization of the signal so generated to indicate mass flow will be hereinafter described.

It should be noted that several pairs of transducers spaced angularly around the conduit means would increase the number of pulses per unit of time and enable a more accurate evaluation of the flow rate to be made.

As with the embodiment of FIG. 2, if desired, deswirl means 32' can be operatively associated with the second fluid conduit means, downstream of the coupling means 24'. Deswirl means 32' can be used to recapture some of the pressure loss caused by the presence of swirl means 26', and can be in a form similar to deswirl means 32' of FIG. 1 within the fluid conduit means 22'. The deswirl means 32' will tend to remove the swirl to straighten out the fluid flow.

In the embodiment of the invention shown in FIG. 6, elements corresponding to those of FIGS. 1 and 2 have been given the same reference characters double primed. Insofar as the fluid conduit means or confined flow path is concerned, the arrangement is identical with that of FIGS. 1 and 2, so that further description would be repetitious.

However, in this embodiment of the invention, a single differential pressure transducer 60 is subjected to pressures at a pair of diametrically opposed points along the fluid conduit means 20''. For this purpose, a pair of pressure taps 61 and 61' are connected in communication with first fluid conduit means 20'' at a pair of respective diametrically opposite points in the vicinity of coupling means 24''. The other ends of taps 61 and 61' are connected to opposite sides of the conventional differential transducer 60.

With the foregoing arrangement, in-phase pressure pulses or fluctuations, such as caused by sonic vibrations, will not result in any output from differential transducer 60, because, at transducer 60, these in-phase pressure pulses oppose each other. However, the out-of-phase pressure pulses or fluctuations due to the precessing fluid swirl will produce an output which is twice that of a single pressure transducer connected at only one point along the flow path. Thus, the differential transducer arrangement of FIG. 6 effects the elimination of extraneous signals and, at the same time generates pressure pulse signals which are amplified by a factor of two. The signals generated by differential transducer 60 are transmitted from terminals 66 and 68.

Although the signals transmitted by the transducer 28 (FIG. 1), the transducers 40 and 40' (FIG. 4), the differential amplifier 44 (FIG. 5) and the differential transducer 60 (FIG. 6) have been referred to as pulses, it should be apparent that by virtue of the precession of the fluid swirl these signals are more nearly sinusoidal and the pulses are actually the lobes of the sinusoids. Since the signals are sinusoidal they have two prime characteristics, i.e., frequency and amplitude which can be converted by conventional circuits to two further signals whose amplitudes represent, respectively, the instantaneous frequency and amplitude of the sinusoidal output signal.

Now, it is readily demonstrated that the product of the density of the fluid and the square of the velocity of the fluid divided by the velocity of the fluid yields the product of density and velocity. It should be noted that the velocity of fluid flow is proportional to volumetric flow rates. Accordingly, the result of such a division yields a mass flow rate. It will be recalled that the frequency of the transducer generated signals is proportional to the velocity of fluid flow and the amplitude of the transducer generated signals is proportional the product of the density and the square of the velocity of fluid flow. Therefore, if the signal representing the frequency of the pressure or temperature fluctuations because of the precession is divided into the signal representing the amplitude of the pressure or temperature fluctuations because of the precession, the resulting quotient signal is proportional to or represents the mass flow rate of the fluid through the fluid conduit means. The apparatus of FIG. 7 performs this function.

The inputs 70 and 72 of the amplifier 74 thereof can be connected to any of the signal outputs of the above described embodiments and amplifier 74 will receive a signal having frequency and amplitude characteristics. The output of amplifier 74 is connected to the input of conventional frequency discriminator 76 which may be of the Foster-Seely type. Discriminator 76 transmits a signal from its output which is proportional to the frequency of the signal received at its input. The output of amplifier 74 is also connected to the input of conventional amplitude detector 78 which includes a rectifier and filter. The output of detector 78 transmits a signal proportional to the amplitude of signal received at its input. The output of discriminator 76 is fed to the divisor input, and the output of detector 78 to the dividend input of conventional analog divider circuit 80. Circuit 80 is a conventional operational amplifier well known in the analog computer art to simulate division and transmits from its output a signal representing the quotient of the dividend and divisor operands represented by signals fed to its two inputs. In the situation described herein, the signal at the output of circuit 80 represents the mass flow rate of the fluid passing through the conduit means. The output of circuit 80 may be coupled to a conventional meter 82 which is calibrated to indicate mass per unit time. If desired, the output of circuit 80 can be connected to a conventional analog-to-digital converter so that the mass flow rate can be telemetered in digital form to a remote station.

If total mass of fluid flowing through the conduit means is desired the output of circuit 80 can be connected to an integrator means 84 of a conventional type such as D.C. motor driven clockwork mechanism whose dial is calibrated in units of mass.

There has thus been shown improved methods and apparatus for indicating mass flow rates and total mass transfer of fluids which utilizes the precession of a swirl component of fluid movement in a conduit. By exploiting the swirl precession and generating therefrom a signal whose frequency represents the velocity of fluid flow and whose amplitude represents the kinetic energy of a unit volume of fluid, it is possible to simplify and reliably obtain an indication of mass flow rate.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for indicating the mass flow of fluid comprising a first fluid conduit means having a downstream end, swirl means to urge a fluid flowing through said first fluid conduit means to assume a swirl condition, a second fluid conduit means coupled to receive the fluid as it leaves the downstream end of said first fluid conduit means and having a cross sectional area greater than that of the first fluid conduit means to cause said swirling fluid to precess, sensor means coupled to sense the frequency and amplitude at which said swirling fluid is precessing, and means coupled to said sensor means for indicating the mass flow of fluid in accordance with the frequency and amplitude of precession of said swirling fluid.

2. Apparatus for indicating the mass flow of fluid comprising a first fluid conduit means having a downstream end, swirl means to urge a fluid flowing through said first fluid conduit means to assume a swirl condition, a second fluid conduit means coupled to receive the fluid as it leaves the downstream end of said first fluid conduit means and having a cross sectional area greater than that of the first fluid conduit means to cause said swirling fluid to precess, pressure sensitive means coupled to sense the frequency and amplitude of pressure fluctuations generated in the fluid by the precession of said swirling fluid, and means coupled to said pressure sensitive means for indicating the mass flow of fluid in accordance with the frequency and amplitude of said pressure fluctuations.

3. Apparatus for indicating the mass flow of fluid comprising a first fluid conduit means having a downstream end, swirl means to urge a fluid flowing through said first fluid conduit means to assume a swirl condition, a second fluid conduit means coupled to receive the fluid as it leaves the downstream end of said first fluid conduit means and having a cross sectional area greater than that of the first fluid conduit means to cause said swirling fluid to precess, a temperature sensitive means coupled to sense the frequency and amplitude of temperature fluctuations generated in the fluid by the precession of said swirling fluid, and means coupled to said temperature sensitive means for indicating the mass flow of fluid in accordance with the frequency and amplitude of same temperature fluctuations.

4. Apparatus for indicating the mass flow of fluid comprising a first fluid conduit means having a downstream end, swirl means to urge a fluid flowing through said first fluid conduit means to assume a swirl condition, a second fluid conduit means coupled to receive the fluid as it leaves the downstream end of said first fluid conduit means and having a cross sectional area greater than that of the first fluid conduit means to cause said swirling fluid to precess, differentially operating sensor means coupled to one of said fluid conduit means to sense the frequency and amplitude at which said swirling fluid is precessing, and means coupled to said sensor means for indicating the mass flow of fluid in accordance with the frequency and amplitude of precession of said swirling fluid.

5. The apparatus of claim 4 wherein said differentially operating sensor means includes a pair of pressure transducers coupled to diametrically opposed portions of one of said fluid conduit means.

6. Apparatus for detecting a property of a flowing fluid comprising: a first fluid conductor, swirl means in said first fluid conductor, said swirl means having passage means therethrough at an acute angle to the axis of flow through said first fluid conductor, a second fluid conductor having at least a region which is of enlarged cross-sectional area with respect to an upstream region, thereby causing said swirling fluid to precess, sensor means disposed downstream of said swirl means and responsive to fluid parameter fluctuations in the precessing fluid to sense the frequency and amplitude at which said swirling fluid is precessing, and means coupled to said sensor means for indicating the mass flow of fluid in accordance with the frequency and amplitude of precession of said swirling fluid.

7. The apparatus of claim 6, wherein said swirl means comprise fixed blades within said first fluid conductor, said blades having a given exit angle with respect to the axis of said first fluid conductor.

8. Fluid parameter indicating apparatus comprising a plurality of pipes coupled together for tandem fluid flow, a fixed deflector structure within one of said pipes for imparting swirl to the flow, and positioned at an angle intermediate of the flow path of the fluid and normal thereto, the fluid being made to precess by traversing another of said pipes of increasing cross-sectional dimensions, and apparatus responsive to fluid parameter fluctuations in the precessing fluid to sense the frequency and amplitude at which said swirling fluid is precessing, and means coupled to said sensor means for indicating the mass flow of fluid in accordance with the frequency and amplitude of precession of said swirling fluid.

9. Flow apparatus according to claim 8, including a deflection structure positioned within another of said pipes located downstream with respect to the responsive apparatus to deswirl the fluid flow.

10. In a fluid flow structure, the combination of swirl means in a conduit to convert linear flow to a swirling flow, means to convert the swirling flow to a precessed swirling flow, indicating means to observe the fluctuating fluid dynamic properties of the precessed swirling flow and sense the frequency and amplitude at which said swirling fluid is precessing, and means coupled to said sensor means for indicating the mass flow of fluid in accordance with the frequency and amplitude of precession of said swirling fluid.

11. In a fluid flow structure as defined in claim 10, the combination also including deswirl means to convert the precessed swirling flow to a linear flow.

References Cited

UNITED STATES PATENTS

| | | | |
|---|---|---|---|
| 2,750,798 | 6/1956 | Ruskin et al. | 73—204 |
| 2,794,341 | 6/1956 | Vonnegut | 73—194 |
| 2,813,423 | 11/1957 | Altfillisch et al. | 73—194 |
| 2,834,209 | 5/1958 | Jones et al. | 73—194 |

FOREIGN PATENTS 148,254   12/1962   Russia.

RICHARD C. QUEISSER, *Primary Examiner.*

JAMES J. GILL, *Examiner.*

J. C. GOLDSTEIN, E. D. GILHOOLY,
*Assistant Examiners.*